United States Patent
Pursifull et al.

(10) Patent No.: US 9,835,115 B2
(45) Date of Patent: *Dec. 5, 2017

(54) COMMON SHUT-OFF VALVE FOR ACTUATOR VACUUM AT LOW ENGINE POWER AND FUEL VAPOR PURGE VACUUM AT BOOST

(71) Applicant: Ford Global Technologies, LLC, Dearborn, MI (US)

(72) Inventors: Ross Dykstra Pursifull, Dearborn, MI (US); Joseph Norman Ulrey, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 279 days.

This patent is subject to a terminal disclaimer.

(21) Appl. No.: 14/593,915

(22) Filed: Jan. 9, 2015

(65) Prior Publication Data

US 2016/0201612 A1    Jul. 14, 2016

(51) Int. Cl.
*F02M 25/08* (2006.01)
*F02D 23/00* (2006.01)
(Continued)

(52) U.S. Cl.
CPC ........... *F02M 25/089* (2013.01); *F02D 23/00* (2013.01); *F02D 41/0007* (2013.01);
(Continued)

(58) Field of Classification Search
CPC .......... F02M 25/089; F02M 2025/0845; F02D 23/00; F02D 41/0007; F02D 41/0032;
(Continued)

(56) References Cited

U.S. PATENT DOCUMENTS 5,005,550 A * 4/1991 Bugin, Jr. ............ F02M 25/089
123/520
6,220,271 B1 * 4/2001 Emmerich .............. B60T 17/02
137/113

(Continued)

FOREIGN PATENT DOCUMENTS

DE    102011084539 B3    12/2012

OTHER PUBLICATIONS

Ulrey, Joseph Norman et al., "System and Method for Improving Canister Purging," U.S. Appl. No. 14/593,945, filed Jan. 9, 2015, 82 pages.

(Continued)

*Primary Examiner* — Stephen K Cronin
*Assistant Examiner* — Susan Scharpf
(74) *Attorney, Agent, or Firm* — Julia Voutyras; McCoy Russell LLP

(57) ABSTRACT

Methods and systems are provided for generating vacuum via an ejector arranged in a compressor recirculation flow path and an aspirator arranged in a throttle bypass path, where a suction port of the ejector is coupled with a canister purge valve having two outlet ports. In one example, the canister purge valve may include only a single flow restriction, the flow restriction arranged in a path coupling a fuel vapor purge system with the intake manifold when a solenoid of canister purge valve is open, such that a path coupling the fuel vapor purge system with the suction port of the ejector does not include any flow restrictions upstream of the suction port.

20 Claims, 9 Drawing Sheets

(51) Int. Cl.
  *F02D 41/00*   (2006.01)
  *F02B 33/40*   (2006.01)
  *F02B 37/00*   (2006.01)
  *F02D 11/10*   (2006.01)

(52) U.S. Cl.
  CPC .......... *F02D 41/0032* (2013.01); *F02B 33/40* (2013.01); *F02B 37/00* (2013.01); *F02D 11/10* (2013.01); *F02D 2250/41* (2013.01); *F02M 2025/0845* (2013.01); *Y02T 10/144* (2013.01)

(58) Field of Classification Search
  CPC ...... F02D 11/10; F02D 2250/41; F02B 33/40; F02B 37/00; Y02T 10/144
  USPC .......................................................... 123/520
  See application file for complete search history.

(56) References Cited

U.S. PATENT DOCUMENTS

| | | | |
|---|---|---|---|
| 6,880,534 B2 | 4/2005 | Yoshiki et al. | |
| 6,951,199 B2 | 10/2005 | Suzuki | |
| 7,610,140 B2 * | 10/2009 | Hirooka | B60T 17/02 |
| | | | 123/339.11 |
| 7,848,870 B2 * | 12/2010 | Hirooka | B60T 17/02 |
| | | | 123/445 |
| 7,966,996 B1 * | 6/2011 | Pursifull | F02B 37/127 |
| | | | 123/198 C |
| 8,483,934 B2 | 7/2013 | Cunningham et al. | |
| 9,175,783 B2 * | 11/2015 | Rollinger | F16K 31/12 |
| 9,371,074 B1 * | 6/2016 | Luehrsen | B60W 50/02 |
| 9,574,507 B2 * | 2/2017 | Pursifull | F02D 41/0032 |
| 2007/0295303 A1 * | 12/2007 | Hirooka | B60T 17/02 |
| | | | 123/339.23 |
| 2008/0000456 A1 | 1/2008 | Modien | |
| 2011/0073082 A1 * | 3/2011 | Hattori | F01M 13/022 |
| | | | 123/574 |
| 2011/0146631 A1 | 6/2011 | Konohara et al. | |
| 2012/0016566 A1 | 1/2012 | Cunningham et al. | |
| 2012/0237368 A1 * | 9/2012 | Pursifull | F02B 37/164 |
| | | | 417/55 |
| 2012/0318244 A1 | 12/2012 | Williams | |
| 2013/0255646 A1 | 10/2013 | Ulrey et al. | |
| 2013/0263590 A1 | 10/2013 | Kempf et al. | |
| 2014/0138562 A1 * | 5/2014 | Rollinger | F02B 37/186 |
| | | | 251/12 |
| 2014/0318514 A1 | 10/2014 | Pursifull | |
| 2016/0369721 A1 * | 12/2016 | Pursifull | F02D 41/0032 |

OTHER PUBLICATIONS

Pursifull, Ross Dykstra et al., "System and Method for Improving Canister Purging," U.S. Appl. No. 14/593,985, filed Jan. 9, 2015, 83 pages.

Pursifull, R. et al., "System and Method for Improving Canister Purging," U.S. Appl. No. 14/740,619, filed Jun. 16, 2015, 68 pages.

* cited by examiner

COMMON SHUT-OFF VALVE FOR ACTUATOR VACUUM AT LOW ENGINE POWER AND FUEL VAPOR PURGE VACUUM AT BOOST

FIELD

The present description relates generally to methods and systems for controlling one or more shut-off valves to restrict or direct flow through an aspirator receiving suction flow from a fuel vapor purge system via a three-port canister purge valve and an ejector receiving suction flow from a vacuum reservoir.

BACKGROUND/SUMMARY

Vehicle emission control systems may be configured to store fuel vapors from fuel tank refueling and diurnal engine operations in a canister. During a subsequent engine operation, the stored vapors can be purged into the engine for combustion. Various approaches may be used to generate vacuum for drawing the fuel vapors into the engine. For example, an intake manifold vacuum generated during engine spinning can be used to draw in the stored fuel vapors. However, during conditions when intake manifold pressure is at or above atmospheric conditions (e.g., during boost conditions in a turbocharged engine), an amount of vacuum available in the intake manifold for purging may be reduced, which may lead to incomplete purging and degraded emissions.

In some approaches for providing vacuum for fuel vapor purging to supplement intake manifold vacuum, active or passive vacuum pumps are used to generate vacuum. For example, as shown by Kempf et al. in U.S. 2013/0263590, an ejector which harnesses the venturi effect to generate vacuum may draw stored fuel vapors into an entraining inlet while motive flow passes from a motive inlet to a mixed flow outlet thereof. In this way, stored fuel vapors may be pumped by the ejector from the fuel vapor canister to the engine intake passage.

However, the inventors herein have recognized that in approaches wherein an outlet of a conventional canister purge valve is coupled to a suction port of a passive vacuum pump such as an ejector, the flow restriction present in a conventional canister purge valve may negatively affect performance of the ejector (e.g., by decreasing ejector suction flow rate). For example, while conventional canister purge valves include a flow restriction in close proximity with a solenoid valve to reduce the solenoid force required to actuate the valve, the presence of the flow restriction causes flow exiting the canister purge valve and entering the suction port of an aspirator to undergo two restrictions (e.g., the flow restriction in the canister purge valve and then the flow restriction at the suction port of the aspirator).

In one example, the issues described above may be addressed by vehicle system which includes an ejector in a compressor recirculation passage, an aspirator in a throttle bypass passage, and further includes a canister purge valve having first and second outlets. A single flow restriction may be arranged in a first passage of the canister purge valve coupling a solenoid with the first outlet leading to an intake manifold, while a second passage of the canister purge valve which has no flow restriction may couple the solenoid with the second outlet which leads to a suction port of the ejector. In this way, by providing a path from the fuel vapor purge system to ejector suction port which does not include any flow restrictions, a higher rate of suction flow into the ejector may be achieved relative to configurations wherein fuel vapor purge gases undergo a flow restriction within the canister purge valve before entering an ejector suction port.

Further, a common shut-off valve, or a pair of shut-off valves actuated by a common actuator, may serve to direct intake air from downstream of a turbocharger compressor into one or both of the compressor recirculation path and throttle bypass passage to provide motive flows for the ejector and/or aspirator. Utilizing a common shut-off valve or a commonly-actuated pair of shut-off valves may advantageously reduce costs. For example, the inventors have recognized that it may be advantageous to direct flow into the compressor recirculation flow path during boost conditions (e.g., to generate ejector vacuum while mitigating compressor surge), whereas it may be advantageous to direct flow into the throttle bypass flow path during conditions where intake manifold vacuum is relatively low (e.g., conditions where intake manifold pressure is relatively high, such as boost conditions). Accordingly, it may be advantageous to utilize a common shut-off valve to simultaneously enable both compressor recirculation flow and throttle bypass flow, in some examples.

The technical effect of omitting a flow restriction in a flow path between the fuel vapor purge system and an inlet of an ejector which generates suction to induce fuel vapor purging is that a higher suction flow rate (and thus a higher purge flow rate) may be achieved, even at relatively low boost levels (e.g., when motive flow through the ejector is relatively low).

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

Figure 1:
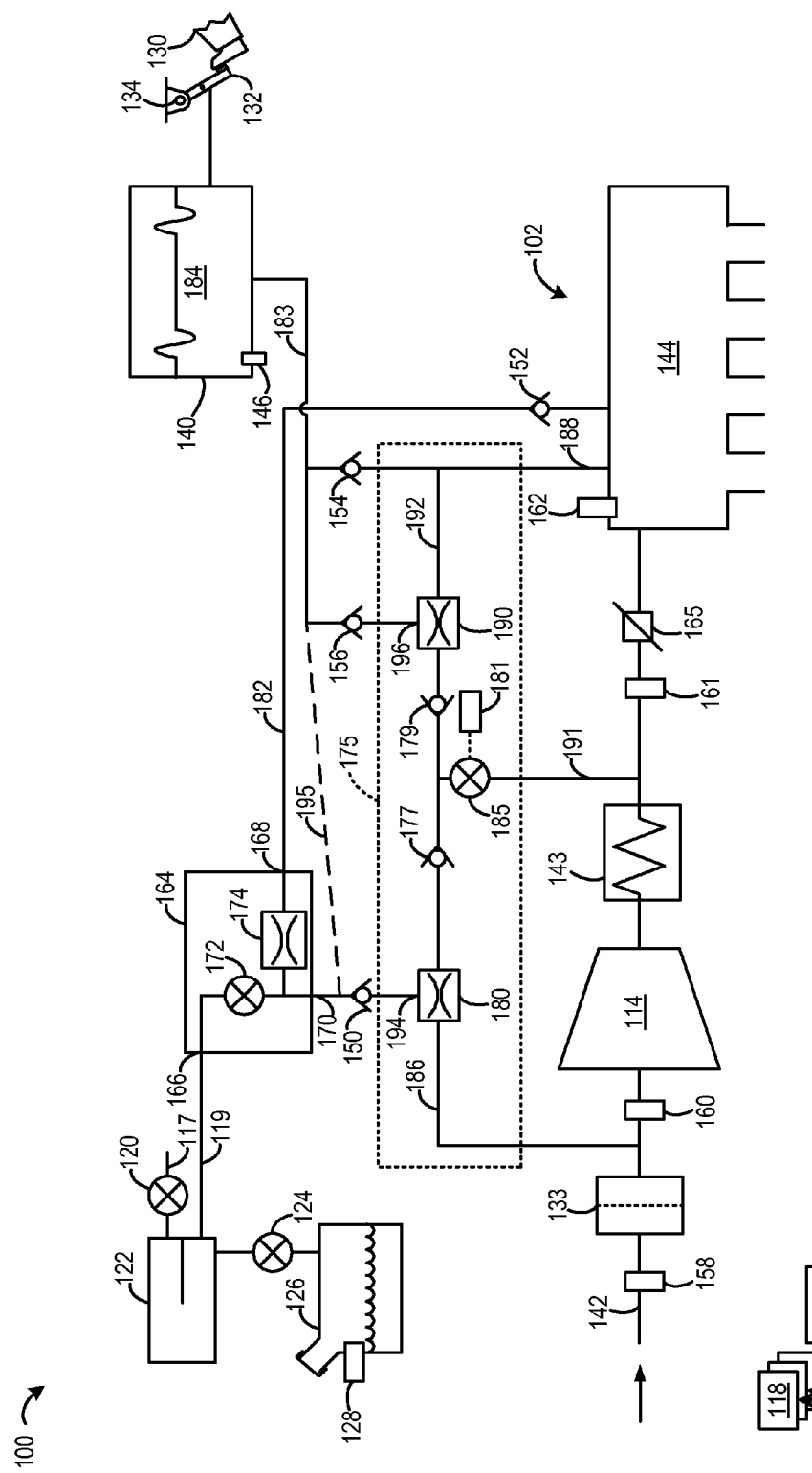
FIG. 1 depicts a schematic diagram of a vehicle system including a first embodiment of a vacuum-generating arrangement.
Figure 2A:
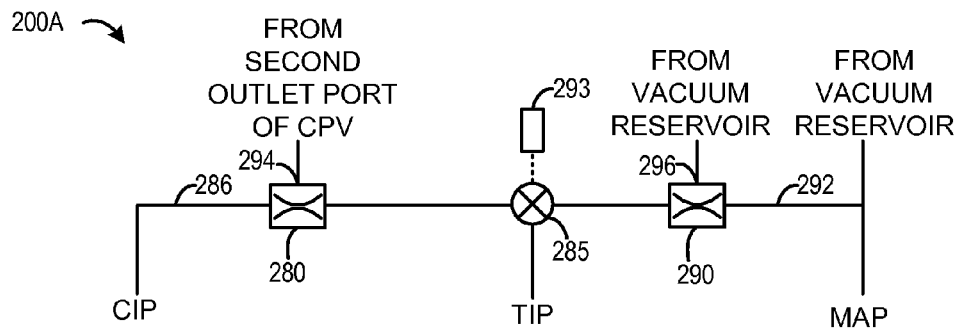
FIG. 2A provides a detail view of a second embodiment of a vacuum-generating arrangement which may be included in the vehicle system of FIG. 1.
Figure 2B:
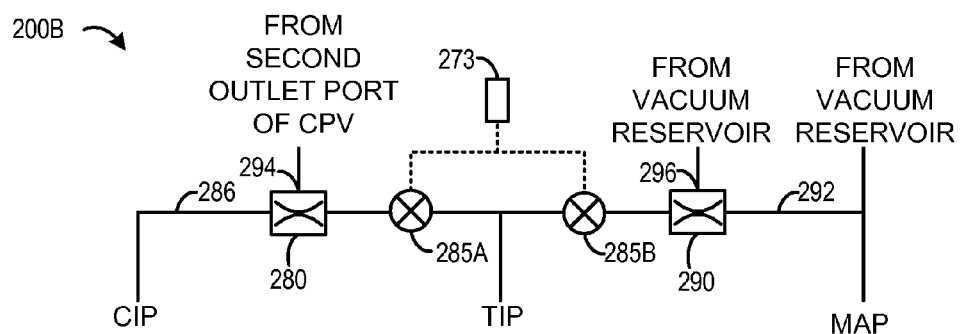
FIG. 2B provides a detail view of a third embodiment of a vacuum-generating arrangement which may be included in the vehicle system of FIG. 1.

of the vacuum-generating arrangement of FIG. 1 or the vacuum-generating arrangement of FIG. 2B.

Figure 6A:
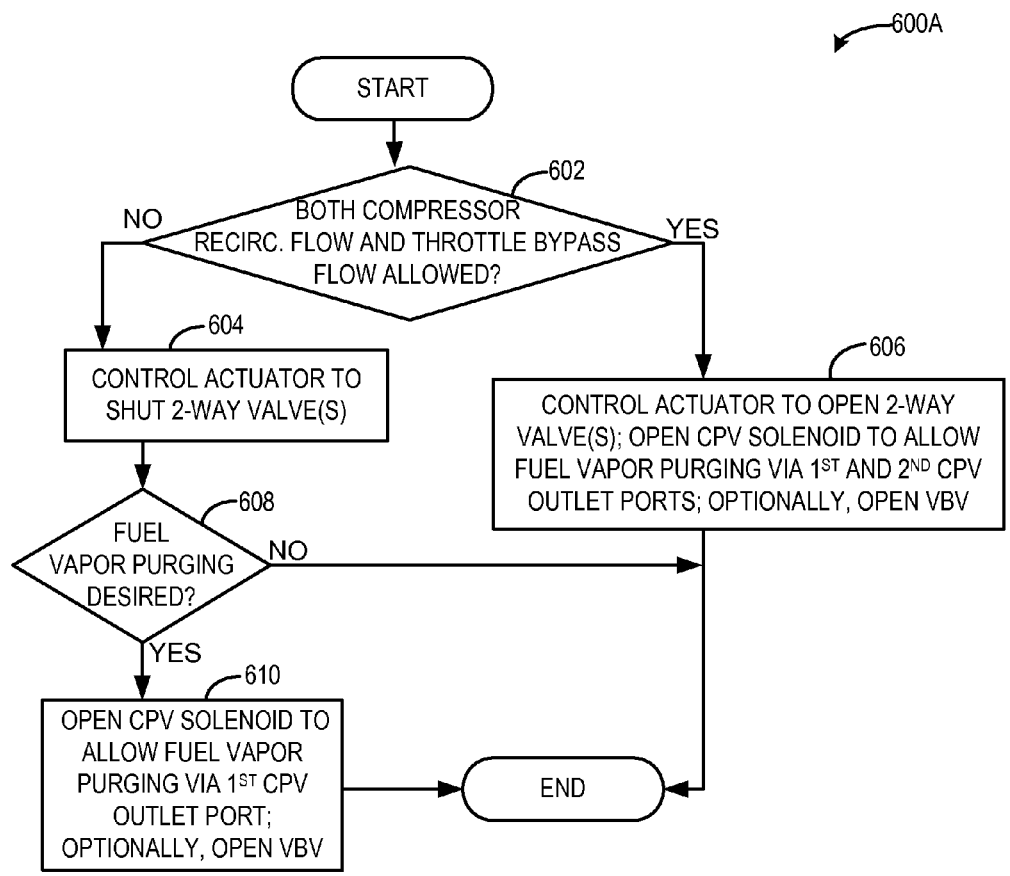
FIG. 6A illustrates an example method for controlling the canister purge valve solenoid as well as the shut-off valve(s)
Figure 6B:
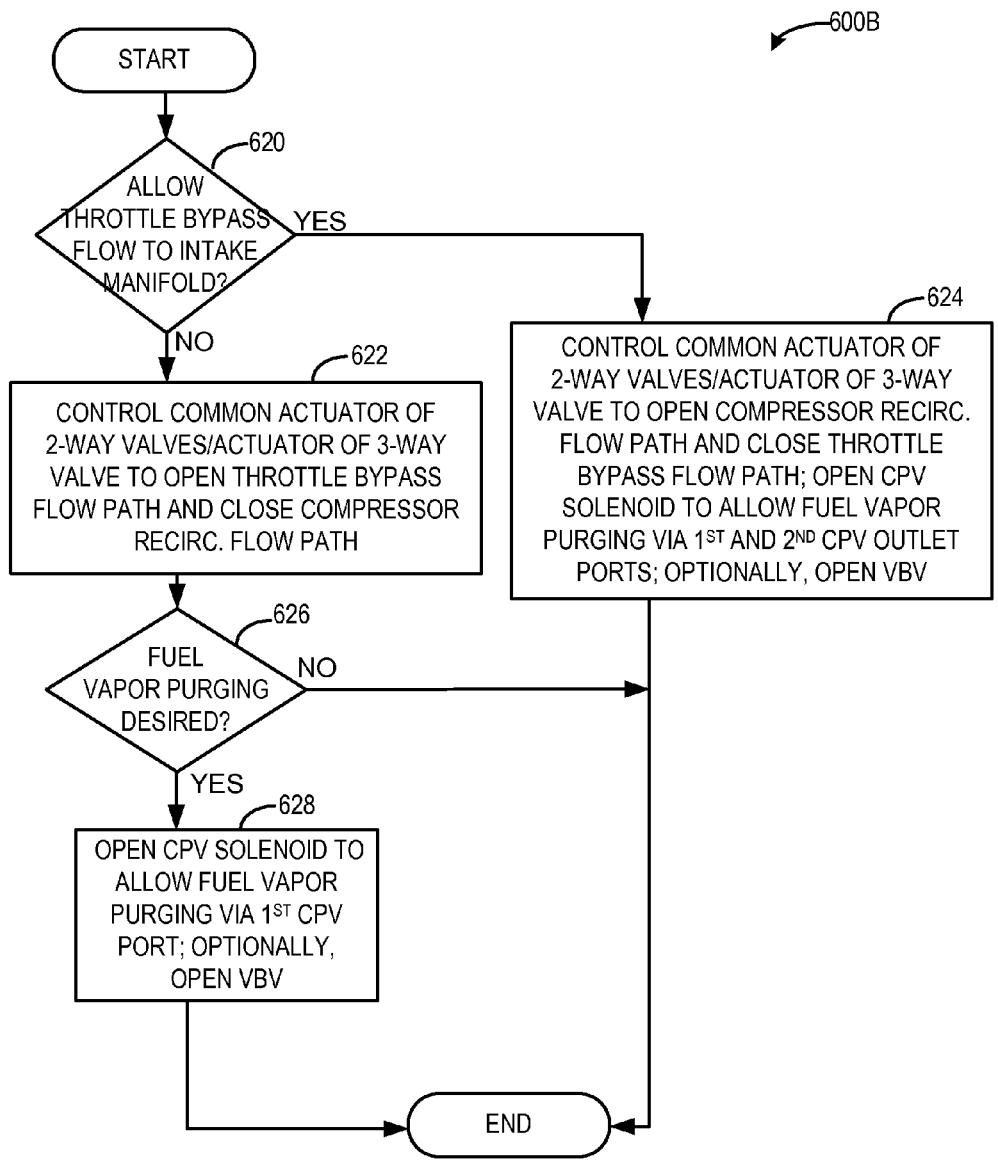

FIG. 6B illustrates an example method for controlling the canister purge valve solenoid as well as the shut-off valve(s) of the vacuum-generating arrangement of FIG. 2A or the vacuum-generating of FIG. 2B.

Figure 2C:
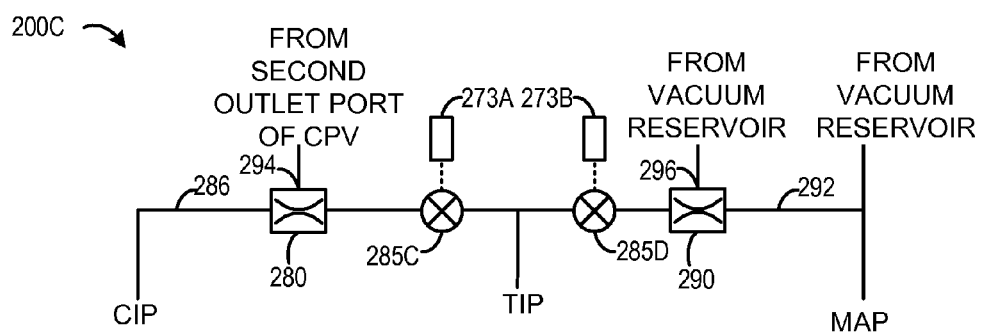
FIG. 2C provides a detail view of a fourth embodiment of a vacuum-generating arrangement which may be included in the vehicle system of FIG. 1.
Figure 6C:
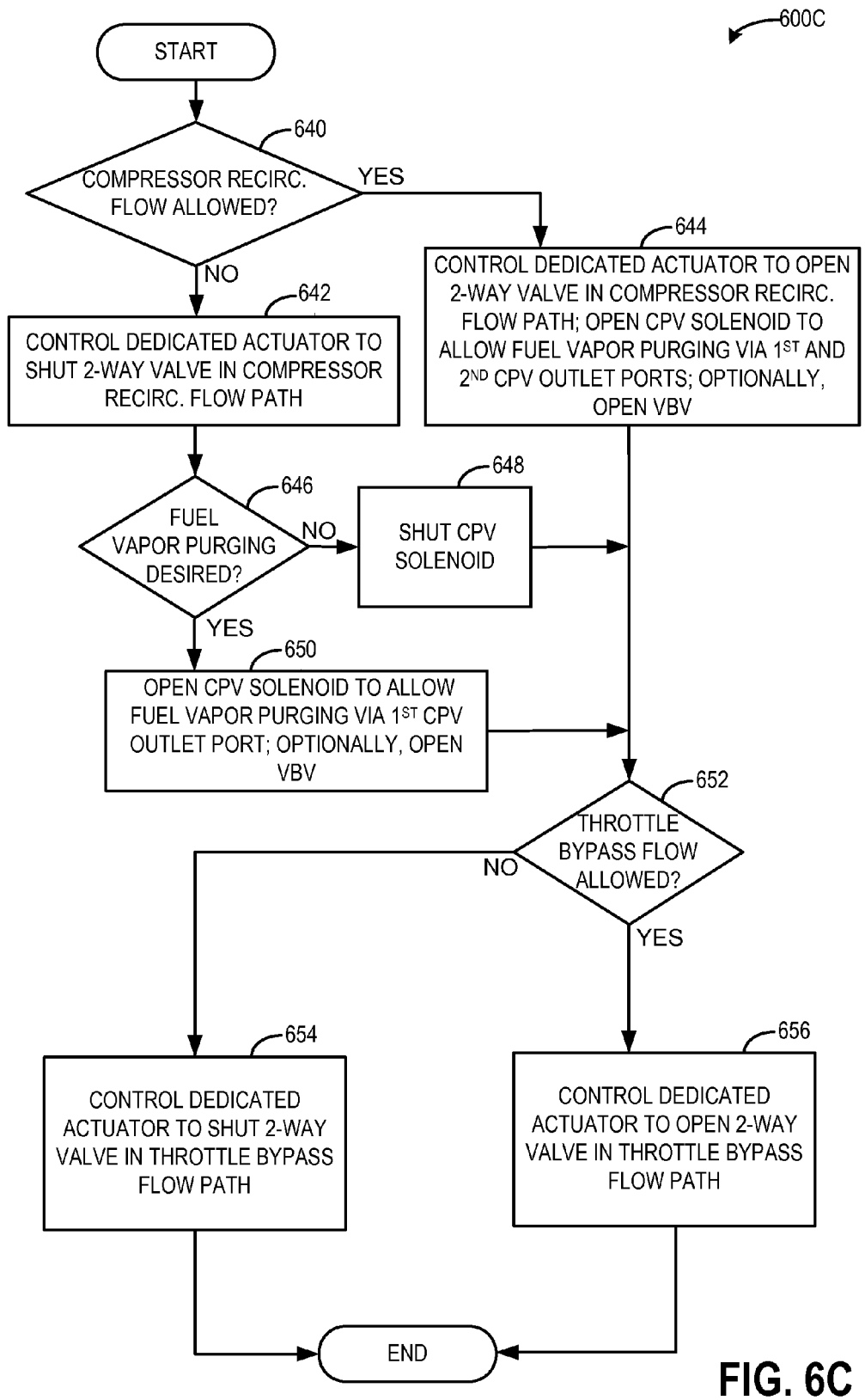

FIG. 6C illustrates an example method for controlling the canister purge valve solenoid as well as the shut-off valves of the vacuum-generating arrangement illustrated in FIG. 2C.

Figure 7:
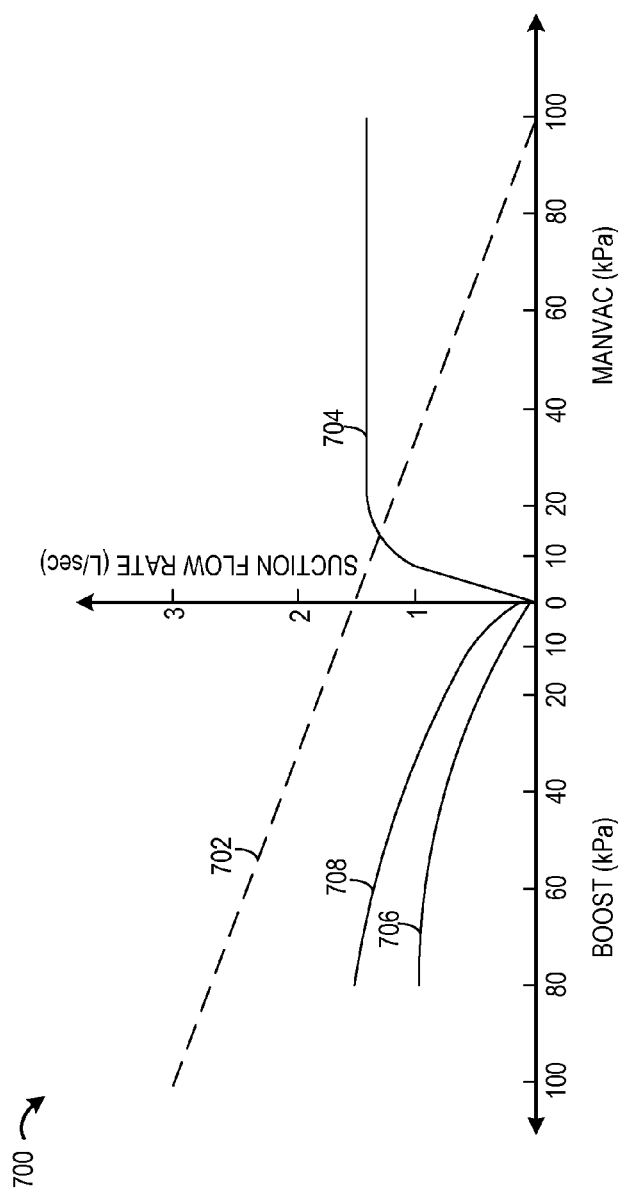

FIG. 7 illustrates a graph of flow characteristics in different engine system arrangements.

DETAILED DESCRIPTION

The following description relates to systems and methods for controlling one or more shut-off valves to restrict or direct compressor recirculation flow and throttle bypass flow to the intake manifold. During conditions where compressor recirculation flow is enabled via control of the shut-off valve(s), fuel vapor purging may be achieved via suction flow into a suction port of an aspirator arranged in a compressor recirculation flow passage, the suction flow induced by the motive compressor recirculation flow passing through the aspirator. Further, during conditions where throttle bypass flow to the intake manifold is enabled via control of the shut-off valve(s), vacuum may be generated at a vacuum reservoir for use by one or more vacuum consumers of the vehicle system (e.g., a brake booster, vacuum-actuated valves, etc.) via suction flow into a suction port of an ejector arranged in a throttle bypass flow passage, the suction flow induced by the motive throttle bypass flow passing through the ejector. In this way, via control of the shut-off valve(s) which arbitrate motive flow through the aspirator and ejector, fuel vapor purging and/or vacuum generation may be achieved during conditions where directing motive flow through the aspirator and/or ejector will not comprise engine operation or produce other undesirable consequences.

As shown in FIG. 1, the vehicle system may include a first embodiment of a vacuum-generating arrangement receiving suction flow from a fuel vapor purge system via a 3-port canister purge valve (CPV) and from a vacuum reservoir, among other possible vacuum sources. The 3-port CPV may include an inlet port coupled to a fuel vapor storage canister, a first outlet port coupled to an engine intake manifold, and a second outlet port coupled to a suction/entraining inlet of an aspirator which receives compressor recirculation flow as motive flow during certain conditions. A solenoid arranged within the CPV may be controlled to at least partially restrict flow entering the CPV (e.g., in a partially or fully closed position of the CPV, or while the CPV is duty-cycled between open and closed positions) or to allow flow to enter the CPV unrestricted (e.g., in an open position). While a flow restriction (e.g., a sonic choke) may be present in the CPV in a passage coupled downstream of the solenoid and upstream of the first outlet port, a passage coupling an outlet of the solenoid and upstream of the second outlet port may not include any flow restriction whatsoever. Similarly, the second outlet port of the CPV itself may not include any flow restriction, such that flow may travel from the fuel vapor purge canister into the CPV and then out of the CPV via the second outlet port without being restricted. This lack of flow restriction may contribute to the achievement of a high rate of suction flow into the suction port of the aspirator even at low boost levels (e.g., when motive flow through the aspirator is relatively low). As shown in FIG. 1 and FIGS. 2A-C, various embodiments of vacuum-generating arrangements for use in the vehicle system shown in FIG. 1 are contemplated. While the vacuum-generating arrangements are depicted as including one aspirator and one ejector, it will be appreciated that other quantities of vacuum-generating devices may alternatively be used without departing from the scope of this disclosure. The vacuum-generating arrangement may include one or more valves (e.g., two-way valves or three-way valves) and corresponding actuators, without departing from the scope of this disclosure, such that motive flow through the aspirator and/or ejector may be enabled or disabled as desired depending on engine operating parameters. Example methods for controlling motive and suction flows through/into the vacuum-generating arrangement are depicted in FIGS. 3, 4, 5, and 6A-D. As a few non-limiting examples, the determination of whether motive flow should be directed through the aspirator and/or ejector may depend on various pressures and mass air flows in the vehicle system, e.g. throttle inlet pressure, compressor inlet pressure, desired stored vacuum level, mass air flow in the intake passage, turbocharger spin-up status, etc.

Referring now to FIG. 1, it shows aspects of an example engine system 100 for a motor vehicle. The engine system is configured for combusting fuel vapor accumulated in at least one component thereof. Engine system 100 includes a multi-cylinder internal combustion engine, generally depicted at 102, which may be included in a propulsion system of an automotive vehicle. Engine 102 may be controlled at least partially by a control system including a controller 112 and by input from a vehicle operator 130 via an input device 132. In this example, input device 132 includes an accelerator pedal and a pedal position sensor 134 for generating a proportional pedal position signal PP.

Engine 102 includes an air intake throttle 165 fluidly coupled to an engine intake manifold 144 along an intake passage 142. Air may enter intake passage 142 from an air intake system (AIS) including an air cleaner 133 in communication with the vehicle's environment. A position of throttle 165 may be varied by controller 112 via a signal provided to an electric motor or actuator included with the throttle 165, a configuration that is commonly referred to as electronic throttle control (ETC). In this manner, the throttle 165 may be operated to vary the intake air provided to intake manifold 144 and the plurality of cylinders therein. A barometric pressure sensor 158 may be coupled at an inlet of intake passage 142 for providing a signal regarding barometric pressure (BP). A manifold air pressure sensor 162 may be coupled to intake manifold 144 for providing a signal regarding manifold air pressure (MAP) to controller 112. A throttle inlet pressure sensor 161 may be coupled immediately upstream of throttle 165 for providing a signal regarding throttle inlet pressure (TIP).

Intake manifold 144 is configured to supply intake air or an air-fuel mixture to a plurality of combustion chambers of engine 102. The combustion chambers may be arranged above a lubricant-filled crankcase, in which reciprocating pistons of the combustion chambers rotate a crankshaft. The reciprocating pistons may be substantially isolated from the crankcase via one or more piston rings, which suppress the flow of the air-fuel mixture and of combustion gasses into the crankcase. Nevertheless, a significant amount of fuel vapor, un-burned air, and exhaust gases may 'blow by' the piston rings and enter the crankcase over time. To reduce the degrading effects of the fuel vapor on the viscosity of the engine lubricant and to reduce the discharge of the vapor into the atmosphere, the crankcase may be continuously or periodically ventilated.

Engine system 100 further includes fuel tank 126, which stores a volatile liquid fuel combusted in engine 102. To avoid emission of fuel vapors from the fuel tank and into the atmosphere, the fuel tank is vented to the atmosphere through adsorbent canister 122. The adsorbent canister may have a significant capacity for storing hydrocarbon-, alcohol-, and/or ester-based fuels in an adsorbed state; it may be filled with activated carbon granules and/or another high surface-area material, for example. Nevertheless, prolonged adsorption of fuel vapor will eventually reduce the capacity of the adsorbent canister for further storage. Therefore, the adsorbent canister may be periodically purged of adsorbed fuel, as further described hereinafter. While a single canister 122 is shown, it will be appreciated that any number of canisters may be coupled in engine system 100.

As shown, a vapor blocking valve (VBV) 124 may be optionally included in a conduit between fuel tank. 126 and canister 122, VBV 124 may alternatively be referred to as an isolation valve. In some embodiments, VBV 124 may be a solenoid valve, and operation of VBV 124 may be regulated by adjusting a driving signal (or pulse width) of the dedicated solenoid. During normal engine operation, VBV 124 may be kept closed to limit the amount of diurnal vapors directed to canister 122 from fuel tank 126. During refueling operations, and selected purging conditions, VBV 124 may be opened to direct fuel vapors from the fuel tank 126 to canister 122. By opening the valve during conditions when the fuel tank pressure is higher than a threshold (e.g., above a mechanical pressure limit of the fuel tank above which the fuel tank and other fuel system components may incur mechanical damage), the refueling vapors may be released into the canister and the fuel tank pressure may be maintained below pressure limits. While the depicted example shows VBV 124 positioned in a passage between the fuel tank and canister, in alternate embodiments, the isolation valve may be mounted on fuel tank 126. The VBV may alternatively be referred to as a Fuel Tank Isolation Valve (FTIV).

One or more pressure sensors 128 may be coupled to fuel tank 126 for estimating a fuel tank pressure or vacuum level. While the depicted example shows a pressure sensor coupled to filet tank 126, in alternate embodiments, pressure sensor 128 may be coupled between the filet tank and VBV 124.

Canister 122 further includes a vent 117 for routing gases out of the canister 122 to the atmosphere when storing, or trapping, fuel vapors from fuel tank 126. Vent 117 may also allow fresh air to be drawn into fuel vapor canister 122 during purging of stored fuel vapors from the canister to the intake manifold 144. While this example shows vent 117 communicating with fresh, unheated air, various modifications may also be used. Vent 117 may include a canister vent valve (CVV) 120 to adjust a flow of air and vapors between canister 122 and the atmosphere.

In the configuration shown in FIG. 1, a three-port canister-purge valve (CPV) 164 controls the purging of fuel vapors from the canister into the intake manifold, either along purge line 182 or into an entraining inlet 194 of ejector 180 and then into intake passage 142. CPV 164, which is depicted schematically in FIG. 1, comprises a solenoid 172 and a flow restriction (e.g., sonic choke) 174, along with an inlet port 166 coupled with the canister via passage 119, a first outlet port 168 coupled with the intake manifold, and a second outlet port 170 coupled with the entraining inlet 194 of ejector 180. Opening or closing of CPV 164 is performed via actuation of solenoid 172 by controller 112. When CPV 164 is open, depending on relative pressure levels within the engine system, purge flow may enter inlet port 166 and then continue either into the entraining inlet of ejector 180, or into the intake manifold via passage 182 after passing through flow restriction 174. In contrast to conventional CPVs, which may include a flow restriction such as a sonic choke positioned intermediate the solenoid valve and any outlet port(s), flow exiting solenoid 172 of CPV 164 is not restricted before exiting the second outlet port, and further is not restricted before entering the entraining inlet 194 of ejector 180 after exiting the second outlet port in the embodiment shown in FIG. 1. Put another way, CPV 164 does not include a flow restriction in the passage leading from the outlet of the solenoid to the second outlet port of the CPV, which in turn is coupled to entraining inlet 194 of ejector 180, and as such, flow which exits the outlet of solenoid 172 and then enters entraining inlet 194 of ejector 180 is not restricted in any way. In contrast, flow which exits the outlet of solenoid 172 and then flows directly to the intake manifold via passage 182 is restricted at flow restriction 174 of CPV 164. Advantageously, the flow restriction yields a constant, known flow for a large range of intake manifold vacuum levels. Effectively, in this condition, the suction resource is unlimited and the flow rate is both limited and metered using the restriction. A check valve 152 coupled in passage 182 prevents backflow from intake manifold 144 into canister 122. When purging conditions are met, such as when the canister is saturated, vapors stored in fuel vapor canister 122 may be purged to intake manifold 144 by opening solenoid 172 of CPV 164. For example, as detailed further below, vapors may be purged directly to intake manifold 144 via passage 182, or indirectly to intake manifold 144 after entering the entraining inlet of ejector 180 and then flowing in a passage 186 to intake passage 142 which ultimately leads to intake manifold 144. As will be detailed below, the path taken by vapors purged from the canister may depend upon a state of a shut-off valve 185 as well as on relative pressures within engine system 100.

Engine system 100 may further include a turbocharger compressor 114 for providing a boosted intake aircharge to intake manifold 144. Compressor 114 may be mechanically coupled to and driven by a turbine powered by exhaust gas flowing from the engine. In the configuration illustrated in FIG. 1, the turbocharger compressor also draws fresh air from air cleaner 133 and flows compressed air through intercooler 143. The intercooler cools the compressed air, which then flows via throttle valve 165 to intake manifold 144, depending on the position of throttle valve 165. A compressor inlet pressure sensor 160 is coupled immediately upstream of the compressor for providing a signal regarding compressor inlet pressure (CIP) to controller 112.

As detailed herein, the vehicle system may include a common passage having a first end coupled with an intake passage downstream of the compressor and upstream of the throttle and a second end coupled with a compressor recirculation passage and a throttle bypass passage at a juncture of the compressor recirculation passage and the throttle bypass passage. For example, a recirculation passage may be coupled across compressor 114 to divert a portion of intake air compressed by compressor 114 back upstream of the compressor. The recirculation passage may be formed by passages 186 and 191 when a shut-off valve 185 arranged in passage 191 is at least partially open. For example, as shown in FIG. 1, a first end of passage 186 may be coupled downstream of air cleaner 133 and upstream of CIP sensor 160, and a second end of recirculation passage 186 may be coupled with passage 191 as well as a first end of a passage 192 (where a second end of passage 192 is coupled with a passage 188 which leads to the intake manifold). An amount of air diverted through the recirculation passage formed by passages 186 and 191 may depend upon relative pressures within the engine system as well as the state of shut-off valve 185, as will be detailed below. In one example, the state of shut-off valve 185 may be adjusted by a dedicated actuator 181 as shown in FIG. 1, based on a signal received by the actuator from the controller. By adjusting shut-off valve 185 and thereby varying an amount of air recirculated from downstream of the compressor to upstream of the compressor, a boost pressure provided downstream of the compressor may be regulated. This may in turn enable boost control and surge control. As shown, a check valve 177 may be arranged in passage 186 between a juncture of passage 191 and passage 186 and a motive inlet of ejector 180. Check valve 177 may prevent reverse flow in the recirculation passage (e.g., flow from the second outlet port of the CPV into the entraining inlet of ejector 180 and then out the motive inlet of the aspirator towards the juncture of passage 191 and passage 186. The only components arranged in the compressor recirculation passage may be the shut-off valve, the check valve, and the aspirator.

In addition, a throttle bypass passage may be coupled across throttle 165 to bypass a portion of intake air around the throttle and into the intake manifold. The throttle bypass passage may be formed by passages 192, 191, and part of passage 188 during conditions when shut-off valve 185 arranged in passage 191 is at least partially open. For example, as shown in FIG. 1, a first end of passage 192 may be coupled with passage 191, while a second end of passage 192 may be coupled with passage 188, which leads to the intake manifold. An amount of air bypassing the throttle via the throttle bypass passage formed may depend upon relative pressures within the engine system as well as the state of shut-off valve 185, as will be detailed further below. As shown, a check valve 179 may be arranged in passage 186 between a juncture of passage 191 and passage 192 and a motive inlet of aspirator 190. Check valve 179 may prevent reverse flow in the throttle bypass passage (e.g., flow from a vacuum reservoir into the entraining inlet of aspirator 190 and then out the motive inlet of the ejector towards the juncture of passages 191 and 192, or flow from the intake manifold into the mixed flow outlet of aspirator 190 and towards the juncture of passages 191 and 192. The only components arranged in the throttle bypass passage may be the shut-off valve, the check valve, and the ejector.

Engine system 100 may include one or more vacuum consumption devices that are vacuum-actuated. As an example, engine system 100 may include vacuum consumption device 140 which includes a vacuum reservoir 184. As shown in FIG. 1, vacuum consumption device 140 may be a brake booster, and vacuum reservoir 184 may be a vacuum cavity arranged behind a diaphragm of the brake booster for amplifying a force provided by a vehicle operator 130 via brake pedal 132 for applying vehicle wheel brakes. A vacuum level at vacuum reservoir 184 may be measured or estimated by a pressure sensor 146.

Vacuum reservoir 184 of vacuum consumption device 140 may receive vacuum from the intake manifold during certain engine operating conditions. In addition to receiving vacuum from the intake manifold, vacuum reservoir 184 may also receive vacuum from one or more vacuum generating devices to generate vacuum for consumption by vacuum consumption devices of the engine system such as vacuum consumption device 140. For example, the engine system may include an ejector 180 as well as an aspirator 190. While ejector 180 is referred to as an ejector herein, ejector 180 may be an aspirator, ejector, jet pump, venturi, or other passive vacuum generating device without departing from the scope of this disclosure. Similarly, while aspirator 190 is referred to as an aspirator herein, aspirator 190 may be an ejector, aspirator, jet pump, venturi, or other passive vacuum-generating device without departing from the scope of this disclosure. For example, ejector 180 and aspirator 190 may both be ejectors or aspirators or jet pumps or venturis, etc., or ejector 180 and aspirator 190 may each be a different type of passive vacuum-generating device. As described further below, motive flow through ejector 180 generates a suction flow at the entraining inlet of ejector 180, thereby generating vacuum, e.g. which may be stored in a vacuum reservoir such as vacuum reservoir 184 and provided to various vacuum consumers of the engine system. Similarly, motive flow through aspirator 190 generates a suction flow at the entraining inlet of aspirator 190, thereby generating vacuum, e.g. which may be stored in a vacuum reservoir such as vacuum reservoir 184 and provided to various vacuum consumers of the engine system. Ejector 180 and aspirator 190 are each three-port devices including a motive inlet, a mixed flow outlet, and a throat/entraining inlet. During conditions where motive flow passes through ejector 180/aspirator 190, a mixture of the fluid flow from the motive inlet and the entraining inlet, referred to herein as mixed flow, exits the mixed flow outlet.

In the depicted example, the state of a single two-way shut-off valve 185 may be adjusted via a corresponding actuator 181 to selectively allow or restrict motive flow through ejector 180 and aspirator 190. In the embodiment of the vacuum-generating arrangement embodiment shown in FIG. 1, shut-off valve 185 is a binary valve (e.g., a two-way valve) and may be controlled either fully open or fully closed (shut), where a fully open position of a binary valve is a position in which the valve exerts no flow restriction, and a fully closed position of a binary valve is a position in which the valve restricts all flow such that no flow may pass through the valve. Thus, when shut-off valve 185 is fully open, intake air may flow from downstream of the compressor to upstream of the compressor via the recirculation passage if relative pressures within the vehicle system induce such flow. Further, when shut-off valve 185 is fully open, intake air may flow from downstream of the compressor and upstream of the throttle to the intake manifold via the throttle bypass passage if relative pressures within the vehicle system induce such flow. However, due to the presence of check valves 177 and 179 in the vacuum-generating arrangement, reverse flow in the recirculation and throttle bypass passages may not occur even when the shut-off valve is fully open. In contrast, when shut-off valve 185 is fully closed, intake air flow does not enter the recirculation passage or the throttle bypass passage.

It is contemplated that shut-off valve 185 may alternatively be a continuously variable valve which may be partially opened to varying degrees. Embodiments with a continuously variable shut-off valve may provide greater flexibility in control of the motive flow through ejector 180 and/or aspirator 190, with the drawback that continuously variable valves may be much more costly than binary valves. In other examples, shut-off valve 185 may be a gate valve, pivoting plate valve, poppet valve, or another suitable type of valve.

The state of shut-off valve 185 may be controlled by controller 112 based on various engine operating parameters, such as TIP, CIP, MAP, desired engine air flow, fuel vapor canister loading, etc. Alternatively or additionally, the states of shut-off valve 185 may be adjusted based on a level of vacuum stored in vacuum reservoir 184, e.g. to increase motive flow through ejector 180 and/or aspirator 190 responsive to a low vacuum condition, when such operation is permissible in view of current engine operating conditions. Thus, by varying the motive flow through ejector 180 and/or aspirator 190 via adjustment of the state of shut-off valve 185, an amount of vacuum drawn at the entraining inlets of ejector 180 and aspirator 190 may be modulated to meet engine vacuum requirements.

It will be appreciated that references to adjustment of shut-off valve 185 may refer to either active control via controller 112 (e.g., as in an where shut-off valve 185 is a solenoid valve) or passive control based on a vacuum actuation threshold of the shut-off valve (e.g., in embodiments where shut-off valve 185 is a vacuum-actuated valve). However, as an alternative, shut-off valve 185 may be a pneumatic (e.g., vacuum-actuated) valve; in this case, the actuating vacuum for shut-off valve 185 may be sourced from the intake manifold and/or vacuum reservoir and/or other low pressure sinks of the engine system. In embodiments where the shut-off valve is a pneumatically-controlled valve, control of the shut-off valve may be performed independent of a powertrain control module (e.g., shut-off valve 185 may be passively controlled based on pressure/vacuum levels within the engine system).

The relative arrangement of ejector 180, aspirator 190, and various other components of engine system 100 will now be described. As noted above, ejector 180 includes an entraining inlet 194 fluidly coupled with second outlet port 170 of CPV 164. A check valve 150 arranged in a passage coupling second outlet port 170 with entraining inlet 194 allows fluid flow from second outlet port 170 into entraining inlet 194 while limiting fluid flow from entraining inlet 194 into second outlet port 170. A motive flow passage of ejector 180 is arranged in passage 186, a first end of which is fluidly coupled with intake passage 142 upstream of compressor 114 and a second end of which is fluidly coupled with passage 191 and passage 192. Passage 191 is fluidly coupled with the intake passage 142 downstream of compressor 114 (and optionally downstream of intercooler 143 as shown) and upstream of throttle 165 at a first end thereof, and with a second end of passage 186 at a second end thereof; as discussed above, shut-off valve 185 is arranged in passage 191. Passage 192 is fluidly coupled with both passage 186 and passage 191, at a first end thereof, and with passage 188 at a second end thereof. Passage 188 is fluidly coupled with intake manifold 144 at a first end thereof and with a passage 183 at a second end thereof. A check valve 154 arranged in passage 188 allows air to flow to intake manifold 144 from vacuum reservoir 184 and limits air flow to vacuum reservoir 184 from intake manifold 144.

A motive flow passage of aspirator 190 is arranged in passage 192, while an entraining inlet 196 of aspirator 190 is fluidly coupled with vacuum reservoir 184 via passage 183. That is, passage 183 is fluidly coupled to vacuum reservoir 184 at a first end thereof, while a second end of passage 183 is fluidly coupled with entraining inlet 196 of aspirator 190. A check valve 156 arranged in passage 183 may prevent backflow from the entraining inlet of aspirator 190 towards the vacuum reservoir. Passage 183 is further coupled to a first end of passage 188 intermediate vacuum reservoir 184 and entraining inlet 196; that is, a juncture of the first end of passage 188 with passage 183 is arranged between the vacuum reservoir and the entraining inlet of aspirator 190 (e.g., such that the point at which the first end of passage 188 is coupled to passage 183 is downstream of vacuum reservoir 184 and upstream of entraining inlet 196 of aspirator 190.

Thus, in accordance with the vehicle system of FIG. 1, a vehicle system may include a common shut-off valve for the aspirator and ejector arranged in a common passage (e.g., passage 191), a first check valve (e.g., check valve 177) arranged in the compressor recirculation passage between a motive inlet of the ejector and the juncture of the compressor recirculation passage and the throttle bypass passage, and a second check valve (e.g., check valve 179) arranged in the throttle bypass passage between the motive inlet of the aspirator and the juncture of the compressor recirculation passage and the throttle bypass passage. Further, a vacuum reservoir such as vacuum reservoir 184 may be coupled with a suction port of the aspirator via a third passage (e.g., passage 183). Furthermore, a fourth passage (e.g., passage 188) may couple the third passage with the intake manifold, and the fourth passage may form part of the throttle bypass passage such that it communicates with a mixed flow outlet of the aspirator arranged in the throttle bypass passage.

It will be appreciated that in an alternative embodiment, passages 182 and 183 may be interconnected. Interconnection of passages 182 and 183 allows aspirator 190 to enhance the depth of vacuum at port 168, thus increasing the flow rate when MAP is below but near TIP. When these passages are interconnected, either check valve 152 or check valve 154 becomes redundant, and may be omitted.

As shown in FIG. 1, the vehicle system may optionally include a passage 195. Passage 195 may provide direct fluid communication between the passage which couples second outlet port 170 of CPV 164 with entraining inlet 194 of ejector 180 and passage 183 upstream of check valve 156. The inclusion of passage 195 may provide for enhanced fuel vapor purge vacuum when intake manifold vacuum is between 0 and 15 kPa, thereby enhancing fuel vapor purge during conditions where there may otherwise be no draw on the purge canister. For example, fuel vapor purging may be enhanced via suction of purge vapors from the second outlet port of the CPV into entraining inlet 196 of aspirator 190 via passage 195 (e.g., as the aspirator serves to enhance vacuum during low intake manifold vacuum conditions such as when intake manifold vacuum is in the range of 4-20 kPa). It will be appreciated that this configuration does not result in inadequate aspirator vacuum provided to the brake system, seeing as vacuum may be provided exclusively to the brake system while solenoid 172 of CPV 164 is closed. Further, the system may be controlled to prioritize brake vacuum over purge draw as needed.

Controller 112 may be configured as a microcomputer including a microprocessor unit, input/output ports, an electronic storage medium for executable programs and calibration values, random access memory, keep alive memory, and a data bus. Controller 112 may receive various signals from sensors 116 coupled to engine 102 such as BP sensor 158, MAP sensor 162, CIP sensor 160, TIP sensor 161, brake booster pressure sensor 146, etc. Furthermore, controller 112 may monitor and adjust the position of various actuators 118 based on input received from the various sensors 116. These actuators may include, for example, throttle 165, intake and exhaust valve systems, solenoid 172 of CPV 164, CVV 120, CBV 106, shut-off valve 185, and compressor 114. Storage medium read-only memory in controller 112 can be programmed with computer readable data representing instructions executable by a processor for performing the methods described below, as well as other variants that are anticipated but not specifically listed. Example methods and routines are described herein with reference to FIGS. 3-6.

FIGS. 2A-C provides detail views of alternative vacuum-generating arrangements, which may be included in the vehicle system of FIG. 1 in place of vacuum-generating arrangement 175, for example. Features consistent among the embodiments of FIG. 1 and FIGS. 2A-C are assigned similar reference numerals. Further, as the vacuum-generating arrangements of FIGS. 2A-C may be used in place of vacuum-generating arrangement 175 in the vehicle system of FIG. 1, features of the vehicle system of FIG. 1 may also be mentioned below.

Turning first to FIG. 2A, it provides a detail view of a second embodiment of a vacuum-generating arrangement. In contrast to vacuum-generating arrangement 175 of FIG. 1, vacuum-generating arrangement 200A of FIG. 2A includes a single (e.g., only one) three-way valve 285, rather than a two-way valve. Three-way valve 285 is arranged at a juncture of passages 286 and 292. The state of shut-off valve 285 may be adjusted via a corresponding actuator 293. In a first state of shut-off valve 285, flow in the compressor recirculation passage is enabled, while flow in the throttle bypass passage is disabled. In a second state of shut-off valve 285, flow in the throttle bypass passage is enabled, while flow in the compressor recirculation passage is disabled. Accordingly, at a given time, either recirculation flow or throttle bypass flow may be enabled, but not both simultaneously. Such operation allows for omission of check valves in the recirculation passage and throttle bypass passage; for example, as shown in FIG. 2A, there are no check valves in the recirculation passage or the throttle bypass passage. Embodiments with check valves are possible and may provide some diagnostic, failure mode, or control flexibility advantage.

FIG. 2B provides a detail view of a third embodiment of a vacuum-generating arrangement in which two two-way shut-off valves are provided, which are actuated by a common actuator 273. That is, a two-way shut-off valve 285A is arranged in the recirculation passage intermediate the motive inlet of ejector 180 and the juncture of passage 191 with passages 286 and 292, and a two-way shut-off valve 285B is arranged in the throttle bypass passage intermediate the motive inlet of aspirator 190 and the juncture of passage 191 with passages 286 and 292. As the recirculation passage and throttle bypass passage each include a respective shut-off valve arranged therein, this configuration also allows for omission of check valves in the recirculation passage and throttle bypass passage, as the shut-off valves will only be opened when engine operating conditions permit.

In one example, valves 285A and 285B may be controlled by actuator 273 to open and close in unison, such that the valves are either both open or both closed. This configuration may result in behavior similar to that of vacuum-generating arrangement 175 of FIG. 1. For example, when shut-off valves 285A and 285B are both open, intake air may recirculate from downstream to upstream of the compressor via the recirculation passage if relative pressures within the vehicle system induce such flow, and intake air may also flow from upstream of the throttle to the intake manifold via the throttle bypass passage if relative pressures within the vehicle system induce such flow. In contrast, when shut-off valves 285A and 285B are closed, intake air flow is restricted from entering both the recirculation passage and the throttle bypass passage.

In another example, valves 285A and 285B may be controlled by actuator 273 such that valve 285A is open while valve 285B is closed and valve 285A is closed while valve 285B is open. Thus, in this example, either valve 285A or valve 285B is open at any given time, and both do not open at the same time. This configuration may result in behavior similar to that of vacuum-generating arrangement 200A of FIG. 2A. For example, in a first mode, actuator 273 may open valve 285A while closing valve 285B, such that flow in the compressor recirculation passage is enabled while flow in the throttle bypass passage is disabled. In a second mode, actuator 273 may close valve 285A while opening valve 285B, such that flow in the throttle bypass passage is enabled while flow in the compressor recirculation passage is disabled. Accordingly, at a given time, either recirculation flow or throttle bypass flow may be enabled, but not both simultaneously. As such, similar to the embodiment of FIG. 2A, check valves in the recirculation passage and throttle bypass passage may be omitted; for example, as shown in FIG. 2B, there are no check valves in the recirculation passage or the throttle bypass passage.

FIG. 2C provides a detail view of a fourth embodiment of a vacuum-generating arrangement in which two two-way shut-off valves are provided, which are each actuated by a respective dedicated actuator. As shown, a two-way shut-off valve 285C is arranged in the recirculation passage intermediate the motive inlet of ejector 180 and the juncture of passage 191 with passages 286 and 292, and a two-way shut-off valve 285D is arranged in the throttle bypass passage intermediate the motive inlet of aspirator 190 and the juncture of passage 191 with passages 286 and 292. The state of valve 285C is controlled by actuator 273A, while the state of valve 285D is controlled by actuator 273B. Here again, as the recirculation passage and throttle bypass passage each include a respective shut-off valve arranged therein, this configuration also allows for omission of check valves in the recirculation passage and throttle bypass passage, as the shut-off valves will only be opened when engine operating conditions permit. As shut-off valves 285C and 285D each have a dedicated actuator, the valves may be controlled independently of one another such that flow may travel in none, one, or both of the recirculation passage and the throttle bypass passage at any given time.

FIGS. 3, 4, 5, and 6A-C depict example methods for controlling a vehicle system such as the vehicle system illustrated in FIG. 1, which may include a vacuum-generating arrangement such as one of the vacuum-generating arrangements depicted in FIGS. 1 and 2A-C. For example, in accordance with FIGS. 3, 4, 5, and 6A-C, a method for a vehicle system may include enabling vacuum generation at a suction port of an ejector arranged in a compressor recirculation flow path if spin-up of a turbocharger compressor is completed, the suction port of the ejector coupled with a canister purge valve having a first outlet and a second outlet, the suction port of the ejector coupled with the second outlet, wherein flow from a fuel vapor purge system to the ejector suction port via the second outlet does not undergo any restriction upstream of the suction port of the ejector, and wherein flow from the fuel vapor purge system is restricted intermediate a solenoid of the canister purge valve and the first outlet. The method may further include enabling vacuum generation at a suction port of an aspirator arranged in a throttle bypass flow path if throttle inlet pressure is greater than intake manifold pressure and a level of stored vacuum is below a threshold.

Figure 3:
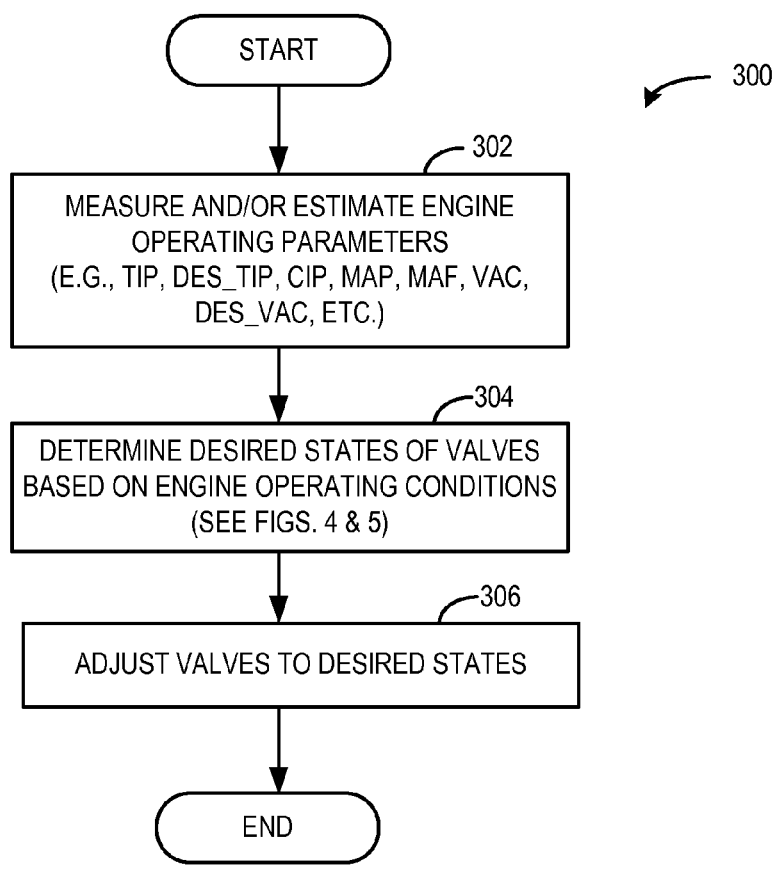
FIG. 3 illustrates an example method for controlling valves of a vehicle system such as the vehicle system of FIG. 1 based on engine operating parameters, which may be implemented in conjunction with the methods of FIGS. 4, 5, and 6A-D.

Now turning to FIG. 3, an example method 300 is shown for controlling valves of a vehicle system such as the vehicle system of FIG. 1 based on engine operating parameters. The valves controlled via method 300 may include any two-way or three-way valves included in the vacuum-generating arrangement, the CPV solenoid, and optionally the VBV of the fuel vapor purge system.

At 302, the method includes estimating and/or measuring engine operating parameters. These may include, for example, TIP, DES_TIP, CIP, MAP, MAF, a parameter representing a desired level of air flow into the engine (e.g., DES_MAF), a parameter representing a current level of stored vacuum (e.g., VAC), a parameter representing a desired level of stored vacuum (e.g., DES_VAC), engine speed, engine temperature, fuel vapor canister load, etc.

At 304, the method includes determining desired states of valves of the vehicle system based on the engine operating parameters measured and/or estimated at 302. For example, the desired states may be determined in accordance with the methods of FIGS. 4, 5, and/or 6A-D, as described further below.

At 306, the method includes adjusting the valves to the desired states determined at 304. For example, in the context of the vacuum-generating arrangement depicted in FIG. 1, adjusting the valves may include adjusting three-way valve 185 to direct flow to one, both, or none of ejector 180 and aspirator 190, adjusting solenoid 172 of CPV 164 and optionally VBV 124 to adjust a level of fuel vapor purge flow entering suction port 194 of ejector 180. Optionally, other valves within the vehicle system may be adjusted at 306, e.g. throttle valve 165, CVV 120, etc. After 306, method 300 ends.

Figure 4:
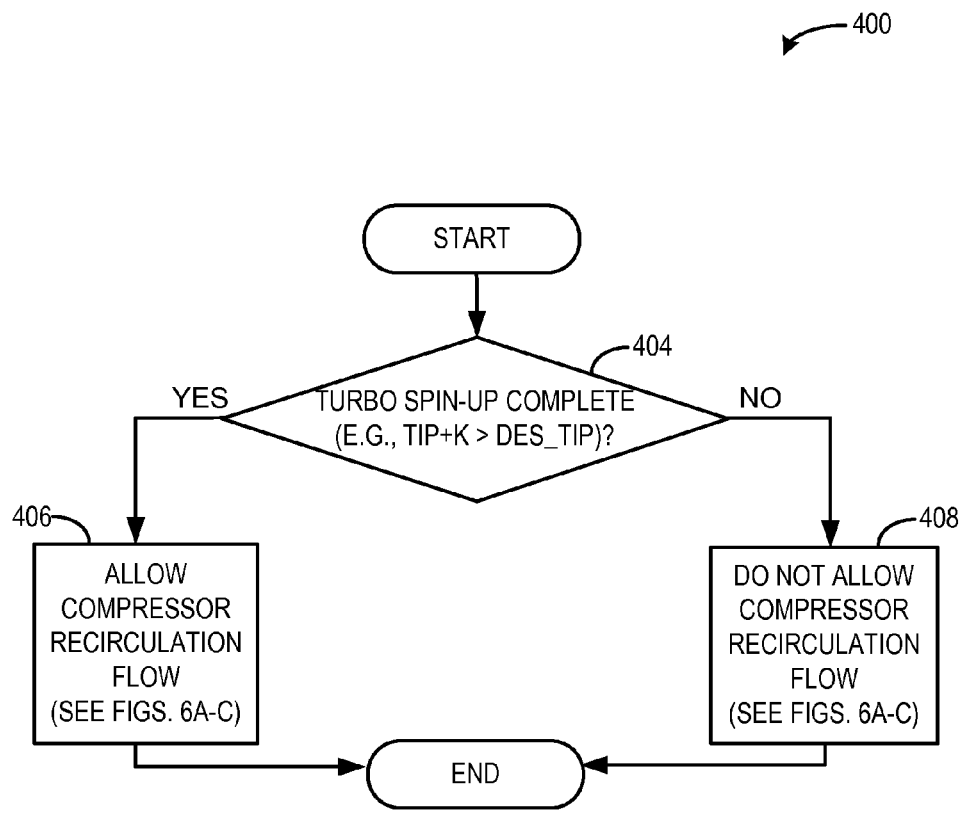
FIG. 4 illustrates an example method for determining whether to allow compressor recirculation flow in a vehicle system such as the vehicle system of FIG. 1.

FIG. 4 illustrates a method for determining desired states of valves such as shut-off valve(s) of a vacuum-generating arrangement, a CPV solenoid valve, a VBV, etc. As noted above, method 400 may be performed at step 304 of method 300 in order to determine desired states of valves based on engine operating parameters.

At 404, method 400 includes determining whether turbocharger spin-up is complete. In one example, determining whether turbocharger spin-up is complete may include determining whether the sum of TIP and a predetermined constant K is greater than DES_TIP. For example, when the sum of TIP and K is greater than DES_TIP, the turbocharger may be close to or above a desired speed, such that compressor recirculation flow (e.g., flow from the throttle inlet to the compressor inlet via the aspirator) may be enabled without slowing pressure rise at the throttle inlet. In one non-limiting example, TIP may be measured and/or estimated by the controller (e.g., based on a signal from a sensor arranged in the intake passage upstream of the throttle, such as TIP sensor 161). Alternatively, other methods of determining whether turbocharger spin-up is substantially complete may be performed at 404 without departing from the scope of this disclosure.

If the answer at 404 is NO, the method proceeds to 408 to indicate that compressor recirculation flow is not allowed. In this case, depending on which embodiment of the vacuum-generating arrangement is included in the vehicle system performing the method, the method of one of FIGS. 6A-D may be performed to determine desired valve states. For example, if the embodiment of the vacuum-generating arrangement shown in FIG. 2A is included in the vehicle system performing the method, the method of FIG. 6A may be performed at 408. As another example, if the embodiment of the vacuum-generating arrangement shown in FIG. 1 is included in the vehicle system performing the method, the method of FIG. 6C may be performed at 408. As yet another example, if the embodiment of the vacuum-generating arrangement shown in FIG. 2B is included in the vehicle system performing the method, the method of FIG. 6D may be performed at 408. As a further example, if the embodiment of the vacuum-generating arrangement shown in FIG. 2C is included in the vehicle system performing the method, the method of FIG. 6B may be performed at 408. After 408, method 400 ends.

Otherwise, if the answer at 404 is YES, the method proceeds to 406 to indicate that compressor recirculation flow is allowed. Depending on which embodiment of the vacuum-generating arrangement is included in the vehicle system performing the method, the method of a corresponding one of FIGS. 6A-D may be performed to determine desired valve states. After 406, method 400 ends.

Figure 5:
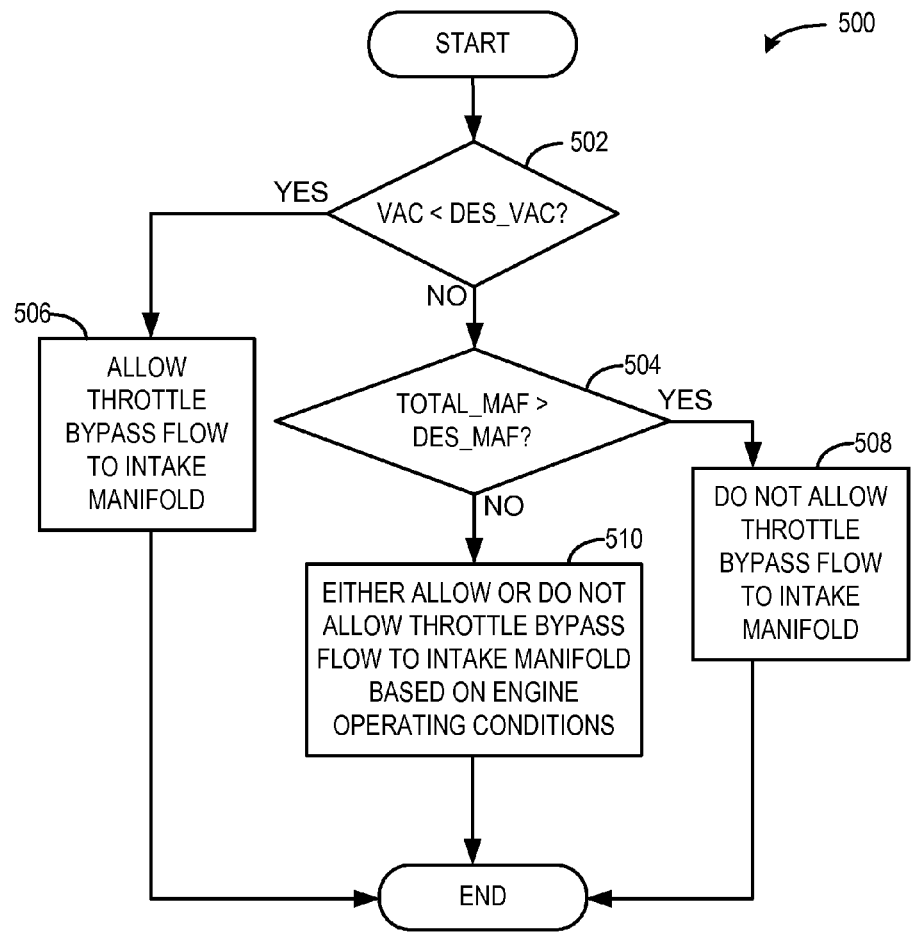
FIG. 5 illustrates an example method for determining whether to allow a throttle bypass flow to an engine intake manifold of a vehicle system such as the vehicle system of FIG. 1.

FIG. 5 depicts an example method for determining whether to allow flow from a throttle inlet of a vehicle system (e.g., the vehicle system shown in FIG. 1) to an engine intake manifold of the vehicle system. Such flow is referred to alternatively herein as throttle bypass flow to the engine intake manifold. In accordance with method 500 shown in FIG. 5, the determination of whether to allow flow from a throttle inlet of a vehicle system to an engine intake manifold of the vehicle system may be based on an amount of vacuum stored in the vehicle system (e.g., in a vacuum reservoir of the vehicle system such as a brake booster vacuum reservoir) and further based on engine mass air flow.

At 502, method 500 includes determining whether a level or amount of vacuum stored in the vehicle system is less than a desired level or amount of stored vacuum (e.g., stored brake booster vacuum). For example, a parameter VAC, which corresponds to a current level of stored vacuum (e.g., negative pressure), may be measured and/or estimated based engine operating parameters such as a signal from pressure sensor 146 arranged in vacuum reservoir 184. Further, a parameter DES_VAC may have a value which corresponds to a desired level of stored vacuum based on current or anticipated engine operating conditions. The controller of the vehicle system may compare the values of VAC and DES_VAC to determine whether VAC is less than DES_VAC. If the answer at 502 is YES, method 500 proceeds to 506 to indicate that throttle bypass flow to the intake manifold is allowed. After 506, method 500 ends.

Otherwise, If the answer at 502 is NO, indicating that VAC is not less than DES_VAC (e.g., the level of vacuum currently stored in the vehicle system is adequate for current and/or anticipated engine operating conditions and vacuum replenishment is not needed), method 500 proceeds to 504. At 504, method 500 includes determining whether the total mass air flow into the engine would be greater than a desired engine mass air flow if throttle bypass flow to the intake manifold is allowed. For example, a parameter TOTAL_MAF, which corresponds to a total mass air flow into the engine if throttle bypass flow into the intake manifold is enabled, may be estimated based on current or anticipated engine operating parameters. Further, a parameter DES_MAF may have a value which corresponds to a desired engine mass air flow rate for current engine operating conditions. The determination of whether the total mass air flow into the engine would be greater than a desired engine mass air flow if throttle bypass flow to the intake manifold is allowed may include, in one example, determining whether TOTAL_MAF is greater than DES_MAF. However, it is contemplated that other methods may be used to determine whether engine air flow rate will remain within an acceptable range if throttle bypass flow to the intake manifold is permitted.

If the answer at 504 is YES, method 500 proceeds to 508 to indicate that throttle bypass flow to the intake manifold is not allowed. After 508, method 500 ends. Otherwise, if the answer at 504 is NO, method 500 proceeds to 510. At 510, method 500 includes either allowing or not allowing throttle bypass flow to the intake manifold based on engine operating conditions. For example, even when VAC is not less than DES_VAC, it may be preferable to allow throttle bypass flow, to generate additional stored vacuum during certain conditions. Alternatively, it may be desirable to not allow throttle bypass flow during certain conditions, to minimize valve actuations for the sake of valve durability.

FIGS. 6A-C depict methods for valve control to selectively permit or restrict throttle bypass flow to the intake manifold via the ejector and compressor recirculation flow via the aspirator. For example, each of FIGS. 6A-C depicts an exemplary method corresponding to one of the vacuum-generating arrangement embodiments shown in FIGS. 1 and 2A-C. The methods of FIGS. 6A-C may be performed in conjunction with the methods of FIGS. 3, 4, and 5, as detailed below.

Method 600A of FIG. 6A is directed to an exemplary method for valve control in a vehicle system which includes a vacuum-generating arrangement such as arrangement 175 of FIG. 1 or arrangement 200B of FIG. 2B.

At 602, the method includes determining whether both compressor recirculation flow and throttle bypass flow are allowed. In one example, this determination may be made by performing method 400 of FIG. 4 along with method 500 of FIG. 5.

If the answer at 602 is YES, method 600 proceeds to 606 to either control the actuator to open the two-way valve (in the context of vacuum-generating arrangement 175 of FIG. 1) or to control the common actuator to open both of the two-way valves (in the context of vacuum-generating arrangement 200B of FIG. 2B) to allow fluid communication between the throttle inlet and the compressor inlet. For example, the controller may send a signal to the actuator which in turn adjusts the state of the two-way valve(s) so as to permit intake air flow from downstream of the compressor and upstream of the throttle into both the compressor recirculation passage and the throttle bypass passage. It will be appreciated that in examples where the state of the two-way valve(s) already permits such flows when step 606 is performed, controlling the state of the two-way valve(s) so as to permit intake air flow from downstream of the compressor and upstream of the throttle into both the compressor recirculation passage and the throttle bypass passage may include taking no action such that the valve(s) remain in their current state. At 606, method 600 further includes opening the CPV solenoid (e.g., CPV solenoid 172 of FIG. 1), which may include keeping the CPV solenoid open if it is already open. In this way, motive flow that passes through the aspirator in the compressor recirculation flow path may induce suction flow from the fuel vapor purge system, so as to purge fuel vapors from the fuel vapor canister into the intake via the second outlet port of the CPV (e.g., after entering the aspirator, exiting the mixed flow outlet of the aspirator, and flowing into the intake passage upstream of the compressor). Further, due to the open state of the CPV solenoid, fuel vapors may also be purged from the fuel vapor system directly to the intake manifold (e.g., without first entering the intake passage) via the first outlet port of the CPV during conditions where relative pressures within the vehicle system induce such purging. Optionally, at 604, method 600 may additionally include opening the VBV (e.g., VBV 124 of FIG. 1). Opening the VBV may be useful for reducing the fuel tank pressure such that is it close to atmospheric pressure (in a vented tank system) or the maximum tank pressure (in a non-vented tank system). However, emptying the fuel vapor storage canister may be done more effectively with the VBV closed. After 606, method 600A ends.

Otherwise, if the answer at 602 is NO, the method proceeds to 604 to control the actuator to shut the two-way valve(s) (or to keep the two-way valve(s) shut if they are already shut), such that flow through both the recirculation passage and throttle bypass passage is disabled.

After 604, the method proceeds to 608 to determine whether fuel vapor purging is desired. In one example, the determination may be based on a comparison of a desired level of stored vacuum (e.g., stored in the control system as parameter DES_VAC) with a current level of stored vacuum (e.g., as measured and/or estimated based on a signal from a sensor such as sensor 146 of FIG. 1 and stored in the control system as parameter VAC), wherein fuel vapor purging is desired when DES_VAC is less than VAC by a predetermined amount. In another example, the determination may be made by the control system based on vacuum requests made by vacuum-actuated devices within the vehicle system (e.g., a brake booster).

If the answer at 608 is NO, method 600A ends. Otherwise, if the answer at 608 is YES, the method proceeds to 610 to open the CPV solenoid. For example, even during conditions where compressor recirculation flow is not allowed (and thus fuel vapor purging via the second outlet port of the CPV is not enabled), fuel vapors may be purged via the first outlet port of the CPV into the intake manifold depending on the pressure levels in the intake manifold and the CPV/fuel vapor purge system. Optionally, at 610, the method may additionally include opening the VBV (e.g., VBV 124 of FIG. 1) After 610, method 600A ends.

Therefore, in accordance with method 600A, enabling vacuum generation at the suction port of an ejector may include opening a first two-way shut-off valve arranged upstream of a motive inlet of the ejector in the compressor recirculation flow path, while enabling vacuum generation at the suction port of the aspirator may include opening a second two-way shut-off valve arranged upstream of a motive inlet of the aspirator in the throttle bypass flow path. The first and second shut-off valves are controlled by a common actuator, and wherein the common actuator controls both the first and second shut-off valves to a same state such that the first and second shut-off valves are either both open or both closed.

Method 600B of FIG. 6B is directed to an exemplary method for valve control in a vehicle system which includes a vacuum-generating arrangement such as arrangement 200A of FIG. 2A or arrangement 200B of FIG. 2B.

At 620, method 600B includes determining whether throttle bypass flow to the intake manifold should be allowed, for example in accordance with the method of FIG. 5. If the answer at 620 is YES, the method proceeds to 624 to control the common actuator of the two-way valves or the actuator of the three-way valve to open the compressor recirculation flow path and close the throttle bypass flow path. Further, at 624, the method includes opening the CPV solenoid to allow fuel vapor purging via the first and second CPV outlet ports. Optionally, at 624, the method includes opening the VCV. After 624, method 600B ends.

Otherwise, if the answer at 620 is NO, the method proceeds to 622 to control the common actuator of the two-way valves or the actuator of the three-way valve to open the throttle bypass flow path and close the compressor recirculation flow path.

After 622, the method proceeds to 626 to determine whether fuel vapor purging is desired, for example in the manner described above for step 608 of method 600A. If the answer at 622 is NO, method 600B ends. Otherwise, if the answer at 622 is YES, the method proceeds to 628. At 628, method 600B includes opening the CPV solenoid to allow fuel vapor purging via the first outlet port of the CPV, and optionally opening the VBV. After 628, method 600B ends.

Therefore, in accordance with the method FIG. 6B, the first and second shut-off valves may be controlled by a common actuator which controls the first and second shut-off valves to opposite states, such that the first shut-off valve is open when the second shut-off valve is closed and the second shut-off valve is open when the first shut-off valve is closed.

Method 600C of FIG. 6C is directed to an exemplary method for valve control in a vehicle system which includes a vacuum-generating arrangement such as arrangement 200C of FIG. 2C.

At 640, the method includes determining whether compressor recirculation flow is allowed, for example in accordance with method 400 of FIG. 4. If the answer at 640 is YES, the method proceeds to 644 to control the dedicated actuator for the two-way valve in the compressor recirculation flow path to open the valve (e.g., actuator 273A and valve 285C). Further, at 644, method 600C includes opening the CPV solenoid to allow fuel vapor purging via the first and second outlet ports of the CPV, optionally opening the VBV.

After 644, method 600C proceeds to 652 to determine whether throttle bypass flow to the intake manifold is allowed, for example in accordance with method 500 of FIG. 5. If the answer at 652 is YES, the method proceeds to 656 to control the dedicated actuator to open the two-way valve arranged in the throttle bypass flow path (e.g., actuator 273B and valve 285D). After 656, method 600C ends.

Otherwise, if the answer at 652 is NO, the method proceeds to 654 to control the dedicated actuator to shut the two-way valve in the throttle bypass flow path (e.g., actuator 273B and valve 285D). After 654, method 600C ends.

Returning to 640, if the answer is instead NO, the method proceeds to 642 to control the dedicated actuator to shut the two-way valve in the compressor recirculation flow path (e.g., actuator 273A and valve 285C), such that flow from downstream of compressor to upstream of the compressor is disabled.

After 642, method 600C proceeds to 646 to determine whether fuel vapor purging is desired, for example in the same manner described above for step 608 of method 600A. If the answer at 646 is NO, the method proceeds to 648 to shut the CPV solenoid. After 648, the method proceeds to step 652, which is described above.

Otherwise, if the answer at 646 is YES, the method proceeds to 650 to open the CPV solenoid to allow fuel vapor purging via the first outlet port of the CPV, and to optionally open the VBV. After 650, the method proceeds to step 652, which is described above.

Accordingly, as the first and second shut-off valves are each controlled by a dedicated actuator in this example, vacuum generation may be enabled at none, one, or both of the ejector and aspirator via control of the first and second shut-off valves by their respective dedicated actuators.

A graph 700 is shown in FIG. 7, which depicts flow characteristics for different engine system configurations. The Y-axis of graph 700 represents suction flow rate in liters per second. The right side of the X-axis of graph 700 represents intake manifold vacuum (MANVAC) in kPa, while the left side of the X-axis represents engine boost in kPa.

Ideal characteristic 702 of graph 700 represents an ideal relationship between suction flow rate, boost, and MAN-VAC. Example characteristic 704 represents the flow characteristic of a CPV that is fully open and connected to intake manifold vacuum. As shown, example characteristic 704 may be similar to the flow characteristic of a sonic choke. The left side of the graph shows example flow characteristics of an ejector connected to engine boost (e.g., compressed air). The lower curve, example characteristic 706, corresponds to a configuration wherein flow travels through a restriction in the CPV before entering the ejector suction port. The upper curve, example characteristic 708, corresponds to a configuration such as that depicted in FIG. 1, which does not include the restriction. As may be seen in graph 700, the net ejector path efficiency improves when the restriction is out of the way. Further, efficiency matters on the boost side, because it takes compressor bypass flow rate to power the ejector. (Ejector efficiency can be approximated as: [suction_flow_rate*suction_vacuum]/[motive_flow_rate*motive_pressure].) Additional advantages may be achieved via such a configuration when the size of the ejector is increased (e.g., doubled or tripled), as the system may fully benefit from a large ejector when the restriction is out of the way. As the motive flow rate of the ejector increases, it becomes more important to valve off the motive flow rate during the building of boost pressure (to improve time-to-torque).

In another representation, a method for a vehicle system may include, in a first mode, enabling motive flow through an ejector in a compressor recirculation passage, and opening a solenoid arranged in a canister purge valve which has only one flow restriction which restricts flow exiting a first outlet of the canister purge valve but does not restrict flow exiting a second outlet of the canister purge valve which is coupled with a suction port of the ejector. The method may further include, in a second mode, disabling motive flow through the ejector and adjusting the solenoid based on engine operating conditions.

Note that the example control and estimation routines included herein can be used with various engine and/or vehicle system configurations. The control methods and routines disclosed herein may be stored as executable instructions in non-transitory memory. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A vehicle system, comprising:
   an ejector in a compressor recirculation passage and an aspirator in a throttle bypass passage; and
   a canister purge valve having first and second outlets, a single flow restriction arranged in a first passage coupling a solenoid with the first outlet leading to an intake manifold, and a second passage having no flow restriction coupling the solenoid with the second outlet which leads to a suction port of the ejector.

2. The system of claim 1, further comprising a common passage having a first end coupled with an intake passage downstream of a compressor and upstream of a throttle and a second end coupled with the compressor recirculation passage and the throttle bypass passage at a juncture of the compressor recirculation passage and the throttle bypass passage.

3. The system of claim 2, further comprising a common shut-off valve for the aspirator and ejector arranged in the common passage, a first check valve arranged in the compressor recirculation passage between a motive inlet of the ejector and the juncture of the compressor recirculation passage and the throttle bypass passage, and a second check valve arranged in the throttle bypass passage between a motive inlet of the aspirator and the juncture of the compressor recirculation passage and the throttle bypass passage.

4. The system of claim 3, further comprising a vacuum reservoir coupled with a suction port of the aspirator via a third passage, and a fourth passage coupling the third passage with the intake manifold, wherein the fourth passage forms part of the throttle bypass passage and communicates with a mixed flow outlet of the aspirator.

5. The system of claim 4, further comprising a fifth passage coupling the second outlet of the canister purge valve with the third passage upstream of the suction port of the aspirator.

6. An engine method, comprising:
   opening a solenoid arranged in a canister purge valve which has only one flow restriction, the flow restriction arranged in a first passage coupling the solenoid with a first outlet of the canister purge valve which leads to an intake manifold;
   enabling motive flow through an ejector arranged in a compressor recirculation passage, the ejector having a suction port receiving flow from a second outlet of the canister purge valve, the solenoid coupled with the second outlet via a second passage which does not include a flow restriction; and
   enabling motive flow through an aspirator arranged in a throttle bypass passage, the aspirator having a suction port coupled with a vacuum reservoir.

7. The method of claim 6, wherein enabling motive flow through the ejector comprises enabling motive flow through the ejector after turbocharger spin-up is completed.

8. The method of claim 7, wherein enabling motive flow through the ejector further comprises disabling motive flow through the ejector while a turbocharger is spinning up.

9. The method of claim 6, wherein enabling motive flow through the aspirator comprises enabling motive flow through the aspirator if a level of stored vacuum in the vacuum reservoir is less than a desired level of stored vacuum.

10. The method of claim 9, wherein enabling motive flow through the aspirator further comprises disabling motive flow through the aspirator if the level of stored vacuum in the vacuum reservoir is not less than the desired level of stored vacuum and an estimated mass air flow into an engine which would result from enabling motive flow through the aspirator is greater than a desired mass air flow into the engine.

11. The method of claim 10, wherein if the level of stored vacuum in the vacuum reservoir is not less than the desired level of stored vacuum and the estimated mass air flow into the engine which would result from enabling motive flow through the aspirator is not greater than the desired mass air flow into the engine, enabling and disabling motive flow through the aspirator based on engine operating conditions.

12. An engine method, comprising:
   enabling vacuum generation at a suction port of an ejector arranged in a compressor recirculation flow path if spin-up of a turbocharger compressor is completed, the suction port of the ejector coupled with a canister purge valve having a first outlet and a second outlet, the suction port of the ejector coupled with the second outlet, wherein flow from a fuel vapor purge system to the ejector suction port via the second outlet does not undergo any restriction upstream of the suction port of the ejector, and wherein flow from the fuel vapor purge system is restricted intermediate a solenoid of the canister purge valve and the first outlet; and
   enabling vacuum generation at a suction port of an aspirator arranged in a throttle bypass flow path if a level of stored vacuum is below a threshold.

13. The method of claim 12, further comprising opening the solenoid when vacuum generation at the suction port of the ejector is enabled.

14. The method of claim 12, wherein enabling vacuum generation at the suction port of the ejector comprises opening a first two-way shut-off valve arranged upstream of a motive inlet of the ejector in the compressor recirculation flow path.

15. The method of claim 14, wherein enabling vacuum generation at the suction port of the aspirator comprises opening a second two-way shut-off valve arranged upstream of a motive inlet of the aspirator in the throttle bypass flow path.

16. The method of claim 15, wherein the first and second shut-off valves are controlled by a common actuator, and wherein the common actuator controls both the first and second shut-off valves to a same state such that the first and second shut-off valves are either both open or both closed.

17. The method of claim 15, wherein the first and second shut-off valves are controlled by a common actuator, and wherein the common actuator controls the first and second shut-off valves to opposite states, such that the first shut-off valve is open when the second shut-off valve is closed and the second shut-off valve is open when the first shut-off valve is closed.

18. The method of claim 14, wherein the first and second shut-off valves are each controlled by a dedicated actuator, such that the vacuum generation may be enabled at none, one, or both of the ejector and aspirator via control of the first and second shut-off valves by their respective dedicated actuators.

19. The method of claim 12, wherein enabling vacuum generation at the suction port of the ejector comprises controlling an actuator to adjust a three-way shut-off valve arranged at a juncture of the compressor recirculation flow path and the throttle bypass flow path to open a flow path from downstream of the compressor to a motive inlet of the ejector, wherein enabling vacuum generation at the suction port of the aspirator comprises controlling the actuator to adjust the three-way shut-off valve to open a flow path from downstream of the compressor to a motive inlet of the aspirator, and wherein vacuum generation cannot be enabled at both suction ports concurrently.

20. The method of claim 12, wherein enabling vacuum generation at the suction port of the ejector comprises controlling an actuator to adjust a two-way shut-off valve arranged upstream of the suction port of the ejector and the suction port of the aspirator, wherein vacuum generation at the suction port of the aspirator is also enabled whenever vacuum generation at the suction port of the ejector is enabled, and wherein a first check valve is arranged in the compressor recirculation flow path upstream of a motive inlet of the ejector and a second check valve is arranged in the throttle bypass flow path upstream of a motive inlet of the aspirator.

* * * * *